(No Model.)

G. H. PERKINS & O. SMITH.

MECHANICAL MOVEMENT FOR REVERSING MOTION.

No. 314,469. Patented Mar. 24, 1885.

WITNESSES:

INVENTORS

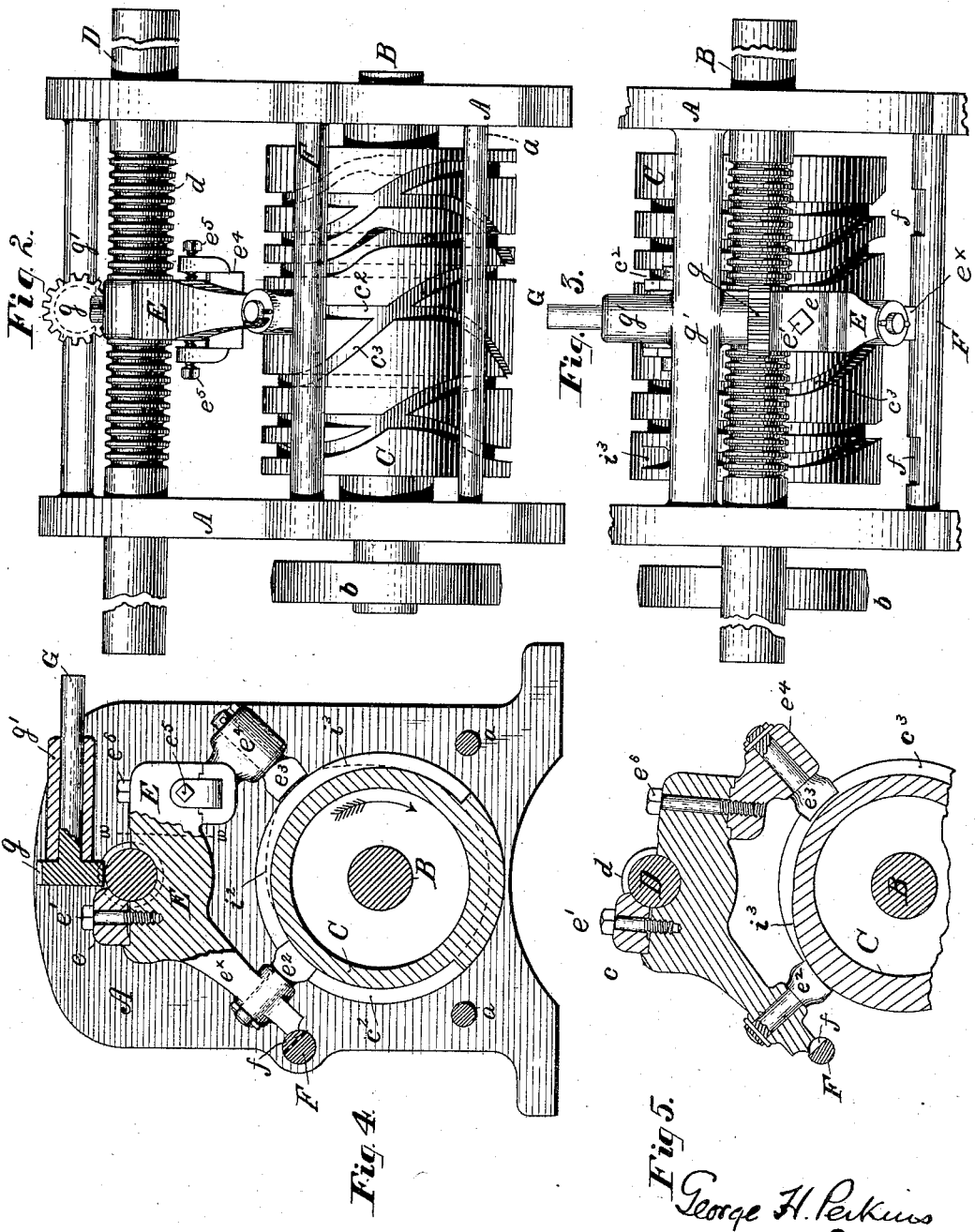

UNITED STATES PATENT OFFICE.

GEORGE H. PERKINS, OF PHILADELPHIA, PENNSYLVANIA, AND OBERLIN SMITH, OF BRIDGETON, NEW JERSEY; SAID SMITH ASSIGNOR TO SAID PERKINS.

MECHANICAL MOVEMENT FOR REVERSING MOTION.

SPECIFICATION forming part of Letters Patent No. 314,469, dated March 24, 1885.

Application filed November 20, 1884. (No model.)

*To all whom it may concern:*

Be it known that we, GEORGE H. PERKINS, of the city and county of Philadelphia, in the State of Pennsylvania, and a citizen of the United States, and OBERLIN SMITH, of Bridgeton, in the county of Cumberland, in the State of New Jersey, and likewise a citizen of the United States, have invented a Mechanical Movement for Reversing Motion, of which the following is a specification.

The object of our invention is the production of a mechanism for converting a constant rotary into a longitudinally-reciprocating movement, and for utilizing said longitudinally-reciprocating movement for producing a reciprocal rotary motion—that is to say, one which alternates in direction.

To the above ends the invention consists in mechanism a convenient embodiment of which is represented in the accompanying drawings and described in this specification, the particular subject-matter claimed as novel being hereinafter definitely specified.

It is proper for us to state that the devices which constitute the subject-matter of this application are embodied and utilized in the production of a certain improved apparatus for automatically soldering the seams which unite the heads or tops and bottoms to the bodies of quadrangular, square, hexagonal, and other shaped sheet-metal cans having angular or approximately angular corners invented by us, for which application for patent was made by us under date of July 22, 1884, the same now being pending, and to further mention that the said devices are not by themselves claimed in the foregoing application, but are only claimed as combined with certain other elements and devices necessary to the construction of a soldering-machine as such.

Figure 1:
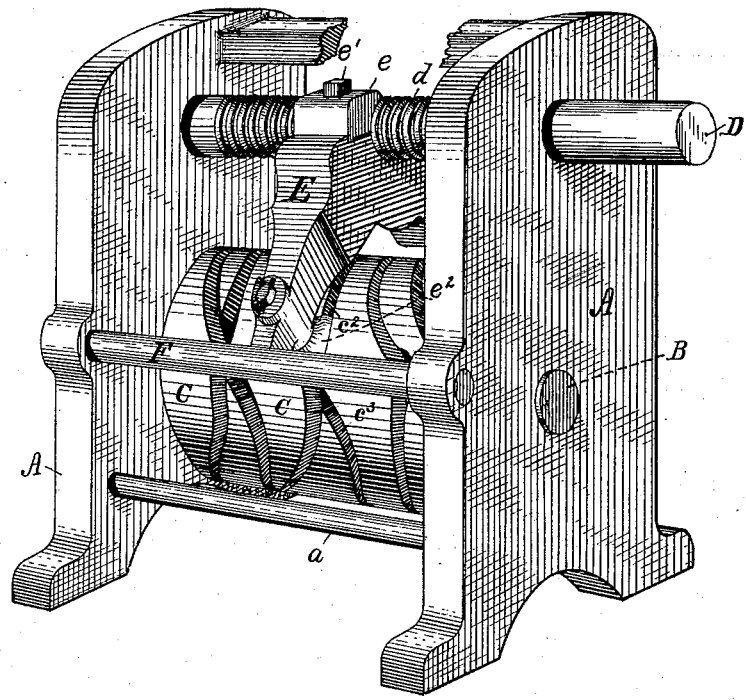
Figure 6:
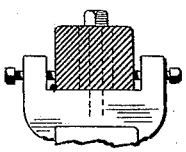

In the accompanying drawings, Figure 1 represents in perspective a mechanism conveniently embodying our invention, the pinion-shaft and its bearing being, for convenience of illustration, omitted. Fig. 2 is a front elevation of the said mechanism. Fig. 3 is a top plan view of the same. Fig. 4 is a transverse sectional elevation of the same, section being supposed through the shuttle carrier and drum when in the position represented in Fig. 2. Fig. 5 is a transverse fragmentary sectional detail through the shuttle-drum and shuttle-carrier. Fig. 6 is a transverse sectional elevational detail through the shuttle-carrier, in the plane of the dotted line $w\,w$ of Fig. 4, and viewed from the left-hand side of said figure, it being designed to represent the adjustable connection of the shuttle-casting with the shuttle-carrier.

Similar letters of reference indicate corresponding parts.

In the drawings, A $a$ is a frame-work, stand, or housing of any preferred construction, configuration, and material, being in the drawings represented as composed of two parallel vertical standards or side frames, which are designated by the letter A, and which are represented as connected by ties $a$. The housing affords points of bearing or support for the various movable parts of the mechanism.

B is the driving-shaft, or shaft of the shuttle-drum C, which is adapted to be actuated in a given direction by any convenient means—such, for instance, as the driving-pulley $b$—so as to occasion the constant rotation of said drum.

C is, as stated, the shuttle-drum, which is a cylinder of suitable diameter, conveniently mounted by means of its shaft in suitable bearings in the housing. The shuttle-drum is provided with two series of sunken channels or camways, which we term "shuttle-ways," which are respectively designated $c^2\,c^3$, and which in opposite directions in continuous helical or approximately helical courses circumscribe the drum. In the particular construction represented the path of each of these shuttle-ways is composed of courses in part right angular and in part diagonal to the axis of the drum, and at each of their extremities the respective shuttle-ways terminate in what we term "lifting-inclines," $i^2\,i^3$, which can best be observed in Figs. 3, 4, and 5. It is to be understood that each of the shuttle-ways, although represented as irregular and sinuous in course, as explained, is continuous from end to end of the drum, and that the two ways intersect or cross each other. It is also to be understood that these shuttle-ways need not necessarily be irregular and sinuous in course, but that they may be constructed in continuous spiral courses of regular and any given pitch, which in opposite directions intersect each other and circumscribe the drum. The office of the shuttle-ways is primarily to occasion the longitudinal travel of the shuttles, as hereinafter explained.

D is the sliding rack-shaft, the same being a cylindric shaft considerably longer than the breadth of the housing, and provided as to its central portion with a cylindric rack, $d$. This shaft is capable not only of longitudinal travel in either direction in its bearings and with respect to the housing, but of oscillation with the shuttle-carrier.

Mounted upon the rack-shaft is the shuttle-carrier E, the same being a two-arm casting, or forging, so to speak, whose shape is best described as that represented in the drawings, and which is fixedly mounted upon the rack-shaft by means of a segmental clamp, $e$, conveniently secured by a bolt, $e'$, the connection being such that any motion imparted to the said shuttle-carrier is transmitted to the rack-shaft. The long arm $e^x$, hereinafter termed simply the "arm," which is to the front of the shuttle-carrier, is provided with what we term a "shuttle," $e^2$, which is a swiveled lug adapted, when suitably deflected, to travel in the shuttle-way $c^2$ of the drum. A second or rear shuttle, $e^3$, of similar construction to the front shuttle, $e^2$, is connected with the shuttle-carrier by an adjustable shuttle casting or forging, $e^4$, a convenient construction of which is represented in Figs. 2, 4, 5, and 6. The shuttle-casting $e^4$ is, as shown in Figs. 2, 4, 5, and 6, by means of the lateral bolts $e^5$ and the vertical bolt $e^6$, laterally adjustable with respect to the shuttle-carrier, and this for the purpose of permitting of a slight longitudinal adjustment of the rack-shaft with respect both to the shuttle-drum and the pinion-shaft which it drives, such adjustment being sometimes desirable, where, for instance, as in our soldering-machine, hereinbefore referred to, the relative position and movement of other driven instrumentalities is to be considered in connection with this mechanical movement employed as a driving device. A reference to Figs. 4 and 5 will show that the two shuttles respectively bridge a segment of the circumference of the shuttle-drum, and that they are so mounted with respect to their carrier that but one shuttle at a time can be engaged in a given shuttle-way of said drum.

Directing our description now to but one of the shuttles, and assuming that the path of the shuttle-ways is such as is represented in the drawings, but remembering that the action of one is in a reverse direction repeated by the other, the following is a description of the operation of the shuttles with reference to the shuttle-drum:

Assuming that the shuttle $e^2$, as in Fig. 4, is controlled to engage within the shuttle-way $c^2$, and, for example, at one extremity thereof, it is obvious that a continuous rotation of the drum in the direction of the arrow in said figure will occasion the travel of said shuttle throughout the length of said shuttle-way $c^2$, and with an intermittent movement correspondent to the courses of its path, and that this movement of the said shuttle will be transmitted to the shuttle-carrier, and consequently to the rack-shaft, so as to occasion the longitudinal intermittent travel of said carrier and said rack-shaft from one side of the machine to the other. We say "longitudinal" because the shuttle-way is, as shown, an approximate helix extending from one end of the drum to the other, and "intermittent" because during the time when the shuttle is in such portions or courses of the shuttle-way as are right angular to the axis of the drum the carrier and rack-shaft will be at rest, while when it is in such portions or courses as are diagonal to the said axis the said carrier and rack-shaft will be in motion with respect to the drum and the housing of the machine.

In order to permit of the entrance of the shuttle under consideration into its shuttle-way, and of its exit therefrom when it has traveled throughout the length thereof, it is necessary that the said shuttle-way should at its respective extremities terminate in the lifting-inclines hereinbefore referred to; and in order to retain the said shuttle in the shuttle-way during the time of its travel through it, it is necessary that the shuttle-carrier should be retained at such an angle as is requisite to accomplish such result. This retention of the shuttle-carrier at a given angle is accomplished by what we term a "shuttle-guide bar," F, which serves as a guard to retain the arm $e^x$ of the shuttle-carrier either in the position represented in Fig. 4, in which event the shuttle $e^2$ is in action, or in the position represented in Fig. 5, in which the shuttle $c^3$ is in action.

The change of the arm $e^x$ from the one position to the other takes place at the completion of the right or left hand movement of the rack-shaft and carrier, and is rendered possible by providing the shuttle-guide bar F with what we term "bar-slots" $f$. (Best seen in Figs. 3 and 5.) When the long arm $e^x$ is abreast of one of these bar-slots, the said arm can move freely through said slot, and in such manner the shuttle-carrier can tilt or change its position, so as to bring one or the other of its shuttles into its respective shuttle-way. This tilt of the shuttle-carrier and consequent throw of its said arm is in the rotation of the drum effectuated by the travel of a given shuttle over one or the other of the lifting-inclines which terminate a given shuttle-way, as will be clearly understood by any mechanic. So soon, therefore, as a given shuttle has traveled up a given lifting-incline, which it does when said shuttle is at the end of its travel through one of its shuttle-ways, its ascent occasions the tilt of the shuttle-carrier, change of position of the arm, and the descent of the opposite shuttle into the other or then returning shuttle-way, which in the conformation and then position of the drum presents itself to said shuttle. The further rotation of the drum by the engagement of the then depressed shuttle in its shuttle-way will instantly, by the converging form of the sides of the lifting-incline or inclination of the shuttle-way, as shown in Fig. 3, occasion such lateral movement of the shuttle-carrier as will retain the arm thereof either above or below the shuttle-guide bar, as the case may then be.

The above action is rendered possible by so disposing the bar-slots of the shuttle-guide bar that they respectively face the respective lifting-inclines—that is to say, by disposing them in such manner that diametric planes projected through the shuttle-drum and intersecting the lifting-inclines will also intersect the said bar-slots. The office of the shuttle-ways of the drum is therefore, as stated, to occasion the continuous although intermittent travel of the rack-shaft from one side of the machine to the other, the periods when said shaft is moving being those periods when a shuttle is in an oblique course of its shuttle-way, and the periods when said rack-shaft is at rest being those periods when the shuttle is in a straight course of its shuttle-way.

The above description will of course be understood to relate to a shuttle-drum the shuttle-ways of which are not continuously spiral in their courses, but irregularly so, and provided with straight portions or courses which are right angular to the axis of the drum.

It is of course manifest that if the shuttle-ways be made regularly helical in continuous courses there will be no stoppage to the sliding of the rack-shaft, but that it will have a continuous end-for-end motion in both directions, the rapidity of which will be dependent upon the pitch of the shuttle-ways; and it will be also manifest that the character of the movement imparted to the shaft will be entirely dependent upon the character and direction of the courses of the said shuttle-ways. Thus, for example, it would be quite possible to impart such curvature to the said ways as to occasion slight backward movements in the advance of the rack-shaft in a given direction.

G is a pinion-shaft, equipped with a pinion, $g$, and housed in a sleeve-bearing, $g'$, suitably secured to the frame-work.

The leaves of the pinion in the mounting of the parts are set to engage with the teeth of the rack, and the motion imparted to the rack is therefore transmitted to the pinion and its shaft. This device is simply shown applied as a means for utilizing the longitudinal reciprocating movement of the rack for the production of a reciprocal rotary movement in the pinion-shaft. The movement of the sliding rack may, however, be utilized in other ways and in various forms of machine.

Further description to explain the operation of the device is unnecessary. In fact, the path of each shuttle-way shown in the drawings—the ways, although reversed, are oppositely identical—being a subject of both mathematical and practical calculation, cannot be further described than in the manner herein already done. It is proper, however, to add that the extent of the lateral travel of the rack-shaft, in the construction represented in the drawings, in a given direction, is governed entirely by the travel of a given shuttle in a shuttle-way of the drum, and that the periods during which the said rack-shaft is at rest, as well as the extent, direction, and duration of its motion, are governed and determinable by the length and trend of the various courses of the shuttle-ways of the drum, and in a measure also by the fact of whether the front or rear shuttle is engaged in its shuttle-way. It is proper also to add that we do not necessarily limit ourselves to a construction of shuttle-drum in which the two shuttle-ways cross each other, as one might be entirely beyond the other in a longitudinal direction upon the drum, in which case of course it would be necessary to arrange the shuttles to a different relative position in regard to the rack—that is, they would have to lie in radial planes of said rack which were a considerable distance removed from each other. Neither do we limit ourselves to the shuttle-ways being upon a single drum, as one of them might be in another and parallel drum, geared to the first drum, so as to be driven by a positive motion. In this case the shuttles could oscillate on the axis of the rack-shaft in the same manner as in the construction shown.

Having thus described our invention, we claim—

1. The combination of a rack-shaft adapted for both oscillatory movement and longitudinal travel, a shuttle-carrier fixedly connected with said rack-shaft and provided with two shuttles, and a drum having two shuttle-ways which in opposite directions in continuous courses circumscribe the drum, and in which ways both shuttles are adapted to be respectively but alternately engaged, whereby upon the rotation of the drum the shuttle-carrier and rack-shaft are caused to travel longitudinally in both directions from end to end of the drum, substantially as set forth.

2. A drum having two shuttle-ways which in opposite directions in continuous courses circumscribe said drum, and which terminate, respectively, in lifting-inclines, in combination with a shuttle-carrier having two shuttles, which are respectively adapted to travel within the respective shuttle-ways of the drum, and with a sliding oscillatory rack-shaft, upon which said shuttle-carrier is mounted, the arrangement being such that first one shuttle is engaged within one shuttle-way and caused to travel throughout its length from end to end of the drum, and then the other shuttle is engaged in the other shuttle-way and caused to travel in the opposite direction throughout its length from end to end of the drum, substantially as and for the purposes specified.

3. A drum having two shuttle-ways which in opposite directions in continuous courses circumscribe said drum, and which terminate, respectively, in lifting-inclines, in combination with a shuttle-carrier having two shuttles, which are respectively adapted to travel within the respective shuttle-ways of the drum, with a sliding oscillatory rack-shaft, upon which said shuttle-carrier is mounted, and with a shuttle-guide bar adapted to retain one or the other shuttle in its respective shuttle-way during its travel through the same, substantially as set forth.

4. A drum having two shuttle-ways which in opposite directions in continuous courses circumscribe the drum, the said respective ways intersecting each other, and being as to portions of their respective courses right angular with respect to the axis of the drum, and as to other portions of said courses oblique thereto, substantially as set forth.

5. A drum having two shuttle-ways which in opposite directions in continuous courses circumscribe the drum, the said respective ways intersecting each other, and being as to portions of their respective courses right angular with respect to the axis of the drum, and as to other portions of said courses oblique thereto, and each of said ways terminating in an incline from the bottom of said way to the exterior surface of the drum, substantially as set forth.

6. In a machine of the class above recited, the shuttle-carrier provided with an arm to which one of the shuttles is applied, and also provided with an adjustable shuttle-casting to which the other shuttle is applied, as and for the purposes set forth.

7. In a machine of the class above recited, in combination with the shuttle-drum, and with the shuttle-carrier provided with an arm and with two shuttles, and mounted and operated as described, a shuttle-guide bar fixed in the housing of the machine, having bar-slots near its respective extremities, and operating substantially as set forth, to retain the arm of the carrier either on its upper or under surfaces and the shuttle-carrier in such position as to cause the engagement of one or the other of its shuttles with the shuttle-drum, as and for the purpose specified.

8. In combination with the shuttle-carrier, the shuttle-casting and means for adjusting the set of said shuttle-casting laterally with respect to said carrier, as and for the purposes set forth.

9. The combination of the rack-shaft, shuttle-carrier, and segmental carrier-head, substantially as described.

In testimony whereof we have hereunto signed our names this 13th day of November, A. D. 1884.

GEORGE H. PERKINS.
OBERLIN SMITH.

Witnesses to the signature of George H. Perkins:
C. F. JOHNSON,
WALTER S. GIBSON.

Witnesses to the signature of Oberlin Smith:
JAMES J. REEVES,
P. KENNEDY REEVES.